(12) United States Patent
Jiang et al.

(10) Patent No.: US 9,376,035 B2
(45) Date of Patent: *Jun. 28, 2016

(54) SEAT ANGLE REGULATOR AND SEAT WITH SAME

(71) Applicant: HUBEI AVIATION PRECISION MACHINERY TECHNOLOGY CO., LTD., Xiangyang, Hubei (CN)

(72) Inventors: Chong Jiang, Hubei (CN); Xing Huang, Hubei (CN); Zhengkun Huang, Hubei (CN); Jian Du, Hubei (CN)

(73) Assignee: HUBEI AVIATION PRECISION MACHINERY TECHNOLOGY CO., LTD., Xiangyang, Hubei (CN)

( * ) Notice: Subject to any disclaimer, the term of this patent is extended or adjusted under 35 U.S.C. 154(b) by 34 days.

This patent is subject to a terminal disclaimer.

(21) Appl. No.: 14/348,145

(22) PCT Filed: Nov. 21, 2012

(86) PCT No.: PCT/CN2012/084932
§ 371 (c)(1),
(2) Date: Mar. 28, 2014

(87) PCT Pub. No.: WO2013/075619
PCT Pub. Date: May 30, 2013

(65) Prior Publication Data
US 2014/0239694 A1    Aug. 28, 2014

(30) Foreign Application Priority Data

Nov. 25, 2011  (CN) .......................... 2011 1 0381621
Nov. 29, 2011  (CN) .......................... 2011 1 0387739

(51) Int. Cl.
*B60N 2/02*    (2006.01)
*B60N 2/225*   (2006.01)

(52) U.S. Cl.
CPC ............ *B60N 2/2252* (2013.01); *B60N 2/2254* (2013.01)

(58) Field of Classification Search
CPC ...... B60N 2/2252; B60N 2/2213; B60N 2/20; B60N 2/22
USPC ................................ 297/362, 362.11, 362.12
See application file for complete search history.

(56) References Cited

U.S. PATENT DOCUMENTS 7,461,900 B2 * 12/2008 Lange ........................ 297/367 R
7,543,889 B2 *  6/2009 Huang et al. .................. 297/362

(Continued)

FOREIGN PATENT DOCUMENTS

CN    1370119    9/2002
CN    1149157    5/2004

(Continued)

OTHER PUBLICATIONS

International Search Report from International Application No. PCT/CN2012/084932 mailed Feb. 28, 2013.

*Primary Examiner* — Laurie K Cranmer
(74) *Attorney, Agent, or Firm* — Merchant & Gould P.C.

(57) ABSTRACT

Disclosed are a seat angle regulator and a seat. The seat angle regulator comprises an inner toothed plate with an inner toothed ring, an outer toothed plate with an outer toothed ring, a wedge block, an eccentric wheel, and a drive component, wherein the inner toothed plate is engaged with the gears of the outer toothed plate, a shaft shoulder is formed in the middle of the inner toothed plate, and the eccentric wheel is sheathed on the outer circumferential face of the shaft shoulder. The drive component comprises a drive cam and a rotating shaft, with one end of the rotating shaft fixedly connected with the middle of the drive cam and the other end penetrating through the eccentric wheel and the shaft shoulder in succession and fixed on the outer end face of the inner toothed plate axially via a locating connector.

20 Claims, 13 Drawing Sheets

(56) References Cited

U.S. PATENT DOCUMENTS

| | | | |
|---|---|---|---|
| 8,128,168 B2 * | 3/2012 | Hayashi et al. | 297/362 |
| 8,590,972 B2 * | 11/2013 | Jiang et al. | 297/362 |
| 8,905,479 B2 * | 12/2014 | Lehmann et al. | 297/362 |
| 9,016,153 B2 * | 4/2015 | Kirubaharan et al. | 74/89.45 |
| 2007/0108824 A1 | 5/2007 | Lange | |
| 2010/0176640 A1 | 7/2010 | Hayashi et al. | |

FOREIGN PATENT DOCUMENTS

| | | |
|---|---|---|
| CN | 201468560 | 5/2010 |
| CN | 101941389 | 1/2011 |
| CN | 202528869 | 11/2012 |
| DE | 10 2006 044 211 | 5/2008 |
| KR | 10-2009-0113173 | 10/2009 |

* cited by examiner sectional view along A-A

SEAT ANGLE REGULATOR AND SEAT WITH SAME

CROSS REFERENCE TO RELATED APPLICATION

The present application is a National Stage Application of PCT/CN2012/084932, filed Nov. 21, 2012, which claims priority to Chinese patent application No. 201110381621.5, titled "SEAT ANGLE REGULATOR AND SEAT WITH SAME" and filed with State Intellectual Property Office of PRC on Nov. 25, 2011, and which claims priority to Chinese patent application No. 201110387739.9, titled "SEAT ANGLE REGULATOR AND SEAT WITH SAME" and filed with State Intellectual Property Office of PRC on Nov. 29, 2011, and which applications are hereby incorporated by reference in their entirety. To the extent appropriate, a claim of priority is made to each of the above disclosed applications.

FIELD

The present disclosure relates to a seat regulating technology, and in particular, to a seat angle regulator and a seat including the seat angle regulator.

BACKGROUND

Seat angle regulators are used in a vehicle seat for connecting a seat base with a backrest to improve the comfortableness of the seat. Passengers may regulate an angle of the backrest to the best position by the seat angle regulator, thereby obtaining a sitting angle which is the most comfortable and most habitual for passengers. For a driver, it is possible to regulate the angle of the backrest for best view and convenience in controlling the steering wheel, pedals, gear lever or the like.

Currently, an electric seat regulator generally employs the planetary gear transmission principle. Due to the unavoidable manufacturing tolerance of parts, therefore, there is a certain gap inside such angle regulator, such that when used, the gap may cause a lager swing of the seat backrest relative to the fore-and-aft direction of the seat and may accompany noises, thereby influencing the comfortableness of the seat. Therefore, there is often provided a gap eliminating mechanism inside the angle regulator.

A seat angle regulator and a seat with the same are disclosed in Chinese patent application CN.201468560U, the seat angle regulator includes an inner toothed plate with an inner toothed ring, an outer toothed plate with outer toothed ring, an eccentric wheel, a wedge block and a drive cam, wherein the inner toothed plate is used for being fixedly connected with the backrest, a shaft shoulder is provided in the middle of the inner toothed plate; the outer toothed plate is used for being fixedly connected with the seat, a shaft center hole is provided in the middle of the outer toothed plate; the outer toothed ring is engaged with the inner toothed ring and there is a radial eccentric area formed between the shaft shoulder and the shaft center hole; the eccentric wheel is disposed in the radial eccentric area, the eccentric wheel, the inner toothed plate and the outer toothed plate constitute a planetary gear transmission mechanism with small teeth number difference; the wedge block is disposed in the radial eccentric area; furthermore, under the action of a circumferential force applied by an elastic member, the eccentric wheel and the wedge block eliminate the gaps between the eccentric wheel and an shaft center hole of the inner toothed plate and between the engaged teeth; the drive cam drives the eccentric wheel or the wedge block, to achieve an angle rotation of the inner toothed plate relative to the outer toothed plate; the eccentric wheel is in an integrated eccentric ring shape, and fully fills a forward eccentric area formed between the shaft of the inner toothed plate and the shaft center hole of the outer toothed plate; the wedge block is disposed in a recess of the eccentric wheel.

In the above-mentioned solution, for the purpose that the wedge block is pressed tightly circumferentially by the elastic member to eliminate the gaps inside the angle regulator and in order to be adapted to the assembling and manufacturing tolerance, the wedge block needs to have an enough circumferential placement space to ensure that the wedge block can be always in a wedged state. Therefore, it is necessary to provide a void operation stoke between the drive cam and the wedge block, as a space indicated by the angles a and b in FIG. 1. In a regulation process of the angle regulator, particularly in a reversing regulation process of the backrest, when the drive cam drives the wedge block by driving the eccentric wheel to reverse, the drive cam needs firstly to pass the preset void operation stoke, i.e., the sum of the angles a and b, and then drives the wedge block to rotate, thereby realizing the reversing regulation of angle of the backrest. Since the drive cam needs to pass a certain void operation stoke, in the seat backrest reversing regulation process, users may feel a relatively obvious delay of the backrest regulation action, there is a certain waiting time, thereby influencing the comfortableness of the use of the seat.

Further, in the backrest reversing process, under the driving of an electric motor, the drive cam firstly rotates to pass the void operation stoke and then contacts with the wedge block/ the eccentric wheel to realize the angle regulation. In this process, because the electric motor has no load, the drive cam hits the static wedge block/the eccentric wheel at a relatively high speed, therefore, in the backrest reversing process, relatively obvious noises will be generated, and also the comfortableness of the seat will be influenced.

Against the above two failure modes, there is disclosed a seat with an adjustable backrest incline angle and particularly an adjusting assembly of vehicle seats in Chinese patent document CN1149157C. In this document there is provided a new solution for improving the comfortableness of a seat, in which a synchronous ring is used to drive two wedges which are pressed tightly toward both sides under the action of an elastic element to eliminate a gap, as shown in FIG. 2. Though this solution may reduce the void operation stoke and weaken noises, after repeated tests, the inventor finds the further drawbacks: since one of the wedges is driven under a friction force of the synchronous ring in the backrest regulation process and this wedge cannot timely and effectively provide a gap required for a motion, an operation torque of the angle regulator would inevitably increase and a fluctuation of the torque value would increase, thereby a burden of an electric motor would increase such that the problems of an increasing noise, easy to overload, a decreased life and the like would occur when the electric motor operates, and for the angle regulator itself, wear and tear of parts would be speeded up, and a trend of increase in the backrest gap would be obvious after the angle regulator is used for a period of time, thereby influencing the stability in the backrest regulation process and the comfortableness in use.

SUMMARY

In order to effectively eliminate a gap of an angle regulator of a backrest and to solve the problems that the response time of the backrest is delayed in a backrest reversing process and that noises occur in the angle regulator reversing process, while effectively controlling the operation torque of the angle regulator such that the operation torque of an angle regulator does not increase; and in order to improve the comfortableness in the seat angle regulation and to avoid noises due to a quick hit of a drive cam against a static wedge block/an eccentric wheel in the backrest reversing process, there is provided a seat angle regulator and a seat with the same in the disclosure. The technical solutions are as follows.

In an aspect, there is provided a seat angle regulator, including:

a gear transmission mechanism including an inner toothed plate with an inner toothed ring, an outer toothed plate with an outer toothed ring, and an eccentric wheel with a wedge block, wherein the inner toothed ring of the inner toothed plate is engaged with the outer toothed ring of the outer toothed plate, a hollow shaft shoulder is formed in a middle of the inner toothed plate, and the eccentric wheel is rotatably sheathed on an outer circumferential surface of the shaft shoulder; and a drive component including a drive cam and a hollow rotating shaft, wherein one end of the rotating shaft is fixedly connected with a middle portion of the drive cam, the other end of the rotating shaft penetrates through the eccentric wheel and the shaft shoulder sequentially and is axially fixed on the inner toothed plate via a locating connector, and the rotating shaft is connected with the shaft shoulder in a clearance fitting manner, wherein a resistance torque structure for transmitting torque is provided on a surface of the drive cam and a surface of the eccentric wheel that is opposite to the surface of the drive cam, and the resistance torque structure is configured to, when the drive cam is driven, transmit a driving torque acting on the drive cam to the eccentric wheel to drive the eccentric wheel to synchronously rotate and realize a torque transmission to the gear transmission mechanism.

The resistance torque structure includes a spring for increasing a friction torque between the eccentric wheel and the drive cam, and the spring realizes the torque transmission between the eccentric wheel and the drive cam by increasing a friction torque between cooperating surfaces of the eccentric wheel and the drive cam.

A drive plate is further provided between the eccentric wheel and the drive cam, the drive plate is sheathed on the rotating shaft between the eccentric wheel and the drive cam, an arc through hole is formed on a plate surface of the drive plate, and a drive arm provided on the drive cam passes through the arc through hole on the drive plate and is rotatably connected with the eccentric wheel; and the drive torque driving the drive cam to rotate is transmitted to the drive plate by a friction torque generated between the drive plate and the drive cam.

Preferably, the drive cam and the drive plate each have a separate structure, and a pre-tightening force generated by the spring acts on cooperating surfaces of the drive plate and the drive cam, such that an end surface of the drive plate abuts against a surface of the drive cam; the drive plate is provided with a positioning hole fitting a protrusion on the eccentric wheel, the positioning hole on the drive plate is fitly connected to the protrusion formed on the eccentric wheel to realize the synchronous rotation of the eccentric wheel and the drive plate, and a clearance in an axial direction of the rotating shaft is formed for the drive plate to adapt to an axial tolerance of the rotating shaft.

Preferably, the spring is a compression spring which is compressed and sheathed on the rotating shaft between the drive plate and the inner toothed plate, one end of the spring acts on an end surface of the drive plate and the other end of the spring acts on the locating connector at an end of the rotating shaft, and the spring is connected with the shaft shoulder of the inner toothed plate in a clearance fitting manner;

by means of the pre-tightening force generated by the spring, the drive plate abuts against the drive cam, and the eccentric wheel is driven to rotate by the friction resistance torque formed by the cooperating surfaces of the drive plate and the drive cam.

Preferably, a friction material for increasing a friction coefficient of the cooperating surfaces of the drive plate and the drive cam is provided on the cooperating surfaces of the drive plate and the drive cam, and the friction material is fixed on the drive plate and/or the drive cam.

Further preferably, in order to improve the set resistance torque value, a movable synchronization pressing plate is provided between the drive plate and the eccentric wheel, and the synchronization pressing plate is sheathed on the rotating shaft between the eccentric wheel and the drive cam;

positioning holes and an arc groove are formed in the synchronization pressing plate, the positioning holes in the synchronization pressing plate fits two drive arms of the drive cam respectively, the synchronization pressing plate and the drive cam are rotatable circumferentially in a synchronized manner after being fitted with each other, and the synchronization pressing plate is axially slidable along the drive arms, and the protrusion on the eccentric wheel penetrates through the arc groove in the synchronization pressing plate and is inserted into the positioning hole on the drive plate;

the pre-tightening force generated by the spring acts on the cooperating surfaces of the drive plate and the drive cam, and cooperating surfaces of the drive plate and the synchronization pressing plate that are engaged with each other, such that side surfaces of the drive plate abut against the drive cam and the synchronization pressing plate, respectively.

Preferably, the spring is a compression spring which is compressed and sheathed on the rotating shaft between the drive plate and the inner toothed plate, one end of the spring acts on an end surface of the synchronization pressing plate and the other end of the spring acts on the locating connector at the end of the rotating shaft, and the spring is connected with the shaft shoulder of the inner toothed plate in a clearance fitting manner;

under the action of the elastic force of the spring, the synchronization pressing plate abuts against one end surface of the drive plate, the other end surface of the drive plate is wedged against the drive cam, and the eccentric wheel is driven by applying a toque to the drive plate through a friction resistance torque formed by the cooperating surfaces of the drive plate and the drive cam and a friction resistance torque formed by the cooperating surfaces of the synchronization pressing plate and the drive plate.

Preferably, the spring is a compression spring with a rectangular section.

Further preferably, a friction material for increasing a friction coefficient is provided on the cooperating surfaces of the drive plate and the drive cam and the cooperating surfaces of the synchronization pressing plate and the drive plate, and the friction material is fixed on the drive plate and/or the drive cam and/or the synchronization pressing plate.

Further preferably, a circumference edge of the drive plate is bended to form an everted buckle edge, an outer circumferential edge of the drive plate is enveloped in the buckle edge, a circumferential ring gap is formed between the buckle edge and the outer circumferential edge of the drive cam enveloped in the buckle edge, and an elastic element for increasing a friction damp at the cooperating surfaces of the drive plate and the drive cam is provided in the circumferential ring gap.

In another aspect, there is provided a seat including a seat base, a backrest hinged to the seat base, and a seat angle regulator disposed between the seat base and the backrest, where the outer toothed plate and the inner toothed plate are each connected to one of the seat base and the backrest, and a gear drive torque driving the gear transmission mechanism to rotate is provided by the drive electric motor acting on the rotating shaft.

In a most preferred angle regulator, the resistance torque structure includes a spring for increasing a resistance torque between the drive plate and the drive cam, the pressing force provided by the spring acts on the drive plate and the strength provided by the spring is enclosed between the drive cam and the drive plate and is not transmitted to the gear transmission mechanism, the spring always makes the drive plate and the drive cam axially close to each other and pressed against each other. When the drive cam drives the drive plate to circumferentially rotate, a friction force between the drive cam and the drive plate will prevent motion of the drive cam, and in this manner, a void stoke of the circumferential rotation of the drive cam and the eccentric wheel is eliminated; by regulating the strength of the spring, it is possible to provide a constant resistance torque between the eccentric wheel and the drive cam.

The operation torque of the angle regulator described in Chinese patent document CN201468560U may be determined by a theoretical analysis and a practical measurement, which is referred to as a gear drive torque for convenience. The operation torque applied to the angle regulator must be greater than or equal to the gear drive torque, so as to drive a planetary gear transmission mechanism with a small tooth-number difference to rotate to achieve the regulation for the angle of the backrest.

A spring is sheathed on the rotating shaft of the drive cam and is provided in the central hole of the shoulder shaft of the inner toothed plate, and under the limiting action of a baffle ring, the spring, taken a specific form of a compression spring with a rectangular cross-section, has one end always applying a pressing force to the drive plate synchronizing with the eccentric wheel, and a friction force generated by the pressing force between the drive plate and the drive cam will prevent a relative rotation of the drive plate and the drive cam; by adjusting the strength of the spring, a torque value of a resistance torque relative to the rotation centre of the drive cam, which is generated by the friction force, may be designed; since the pressing force provided by the spring acts on the drive plate and the strength provided by the spring is enclosed between the drive cam and the drive plate and is not transmitted to the gear transmission mechanism, the gear drive torque of the angle regulator will not increase. According to the requirements for the usage of a seat, it is necessary to adjust a ratio of the resistance torque to the gear drive torque.

When the driving is performed by driving the eccentric wheel, the resistance torque may be used directly to drive the eccentric wheel, which has a gap eliminating structure and synchronizes with the drive plate, to rotate, rather than the case that the drive arm on the drive cam firstly passes the void stoke provided to eliminate a gap for the wedge block and then drives the eccentric wheel to rotate, accomplishing the change of the action transmission path, thereby eliminating the delay of the response to the regulating of the backrest caused by the void stoke of the drive cam and the eccentric wheel, and eliminating noises caused by the direct hit of the drive arm of the drive cam on the eccentric wheel.

When the driving is performed by driving the wedge block of the gap eliminating structure, under the action of the resistance torque, the drive plate firstly drives the eccentric wheel to rotate, and at the same time the wedge block is in a non-driving state, therefore the operation torque required for the entire angle regulator will increase; when the operation torque actually required for the angle regulator remains less than the preset resistance torque, the eccentric wheel will be driven directly to move to realize the rotation of the angle regulator; in this state, the wedge block 6 is in a dragged state, the drive arm 51' on the drive cam 5 cannot hit the narrower end of the wedge block 6, therefore noises caused by hitting will not be generated.

When the required operation torque exceeds the resistance torque, the drive cam will rotate relatively to the drive plate until the drive arm on the drive cam contacts the narrower end of the wedge block; in this process, the operation torque of the angle regulator will not continue to increase; after the drive arm contacts the wedge block, the drive arm on the drive cam will directly drive the narrower end of the wedge block, and then a wider end of the wedge block drives the eccentric wheel to rotate; in this process, since the eccentric wheel remains in a slow motion process and thus the backrest remains in a regulating state, the response of the backrest is not obviously delayed; up to this stage, there is no relative movement between the drive cam and the drive plate, therefore, the drive plate will disappear and the operation torque required for the entire angle regulator will still be equal to the gear drive torque; in the sequent stage, this state will maintain until a suitable angle is obtained by the regulating.

Due to the controllable resistance torque, the electric motor driving the drive cam to rotate remains in the same load condition, it will be understood that the rotating speed of the drive cam in a synchronous movement with the motor remains in a steady state, and the following case arising for the technical solution described in the patent document CN201468560U will not occur: the drive cam firstly experiences a void stoke and then drives the wedge block of the gap eliminating structure or the eccentric wheel, the load of the electric motor varies from very small to large, and the rotating speed decreases passively from a high speed quickly due to the increasing load.

Due to the controllable resistance torque, the drive arm on the drive cam will not contact the eccentric wheel directly; due to the controllable resistance torque, when the drive arm rotates toward the wedge block, the eccentric wheel synchronizing with the driving plate is in a slow motion process; due to the controllable resistance torque, the electric motor driving the drive cam to rotate remains in a load for an essentially constant resistance torque which is essentially adequate for the rotating operation of the angle regulator, the rotating speed of the drive cam in a synchronous movement with the motor remains in a steady state, therefore, when the drive arm on the drive cam contacts the wedge block of the gap eliminating structure, the relative movement speed of drive arm and the wedge block decreases to a very low level, therefore noises generated by the hitting will be controlled within a very low level.

Accordingly, compared with an angle regulator without a resistance torque drive system, the entire operation torque of the angle regulator in the disclosure does not change obviously, which solves successfully the problem occurring in the technical solution of the patent document CN1149157C; the problem of the delay of response to the regulating for the backrest caused by the void operation stoke necessary for adapting with the gap eliminating structure and the assembling and manufacturing tolerance is also solved; noises in the backrest regulating and reversing process are controlled to be quite low.

The seat angle regulator according to the disclosure is adapted for batch production and has features of a good manufacturability and a low manufacturing cost, which is suitable for various seats calling for regulating the backrest angle, particularly suitable for a vehicle seat.

BRIEF DESCRIPTION OF THE DRAWINGS

In order to more clearly describe the technical solution of embodiments of the invention, the drawings necessary for the description of embodiments will be introduced simply hereinafter. Obviously, the drawings described below are merely a few embodiments of the invention, and for those skilled in the art, other drawings can also be obtained according to the drawings without any creative work.

Figure 1:
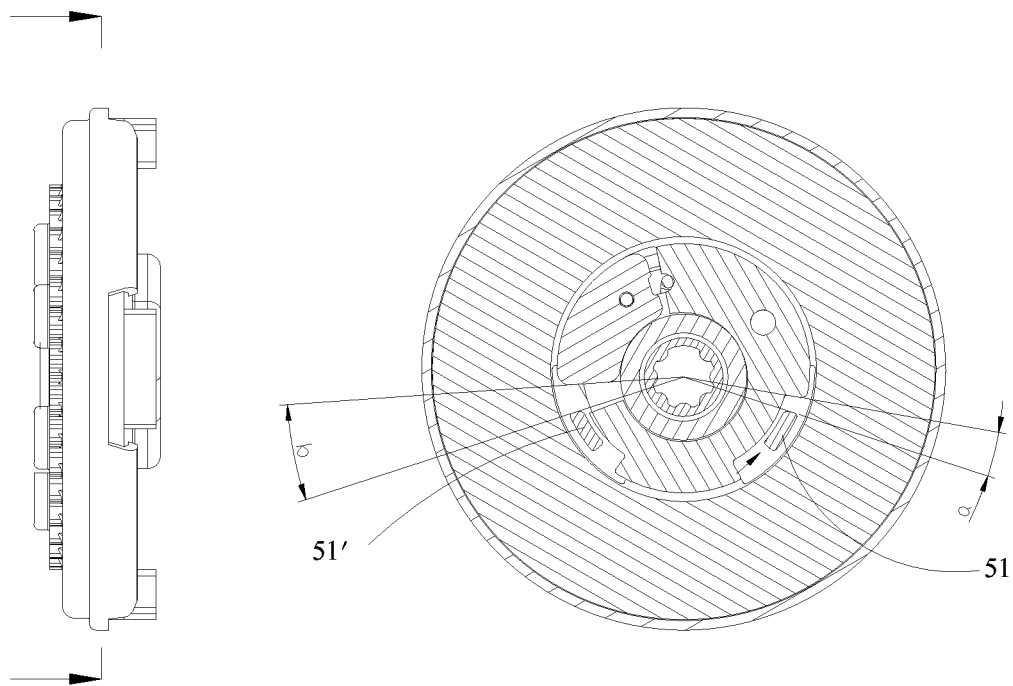
FIG. 1 is a sectional view of the technical solution described in Chinese patent document CN201468560U.
Figure 2:
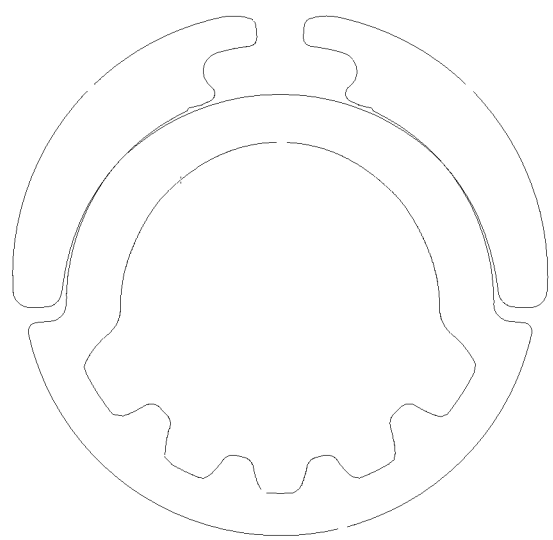
FIG. 2 is an assembling schematic view of the wedge block and the synchronous ring of the technical solution in Chinese patent document CN1149157C.

In the drawings:
100 seat angle regulator; 1 jacket; 2 inner toothed plate; 21 inner toothed ring; 22 shaft shoulder; 23 central hole; 3 outer toothed plate; 31 outer toothed ring; 32 shaft center hole; 4 eccentric wheel; 41 recess; 42 protrusion; 43 protrusion; 44 first accommodating area; 44' second accommodating area; 5 drive cam; 51 first drive arm; 51' second drive arm; 52 rotating shaft; 53 slot; 54 lower surface; 6 wedge block; 7 wedging torsion spring; 71 axial supporting foot; 71' axial supporting foot; 8 drive plate; 8' friction material; 81 arc groove; 82 positioning hole; 83 positioning hole; 84 inner hole; 85 arc hole; 85' arc hole; 86 bottom surface; 87 buckle edge; 8a synchronization pressing plate; 8a1 arc groove; 8a2 arc groove; 8a3 upper surface; 8a4 inner hole; 8a5 positioning hole; 8a5' positioning hole; 8a6 convex hull bottom surface; 8b drive plate; 8b1 positioning hole; 8b2 arc groove; 8b3 arc hole; 8b4 positioning hole; 8b5 inner hole; 8b6 arc hole; 8b7 side surface; 8b8 side surface; 9 spring; 9' elastic element; 10 baffle ring; 11 circumferential ring gap.

DETAILED DESCRIPTION

In order to make objects, technical solutions and advantages of the present disclosure become more clearly, the embodiments of the disclosure will be described hereinafter in detail in connection with the drawings.

Orientation words used herein, such as inner side and outer side, take the axis of the seat angle regulator as the reference, that is, a side close to the axis is an inner side, and a side away from the axis is an outer side. It should be understood that the use of the above-mentioned orientation words should not limit the scope claimed by the patent application.

In addition, a positive eccentric direction herein means the direction of the maximum radial space within an eccentric area, the area in the positive eccentric direction is referred to as a positive eccentric area.

Embodiment 1

Figure 3:
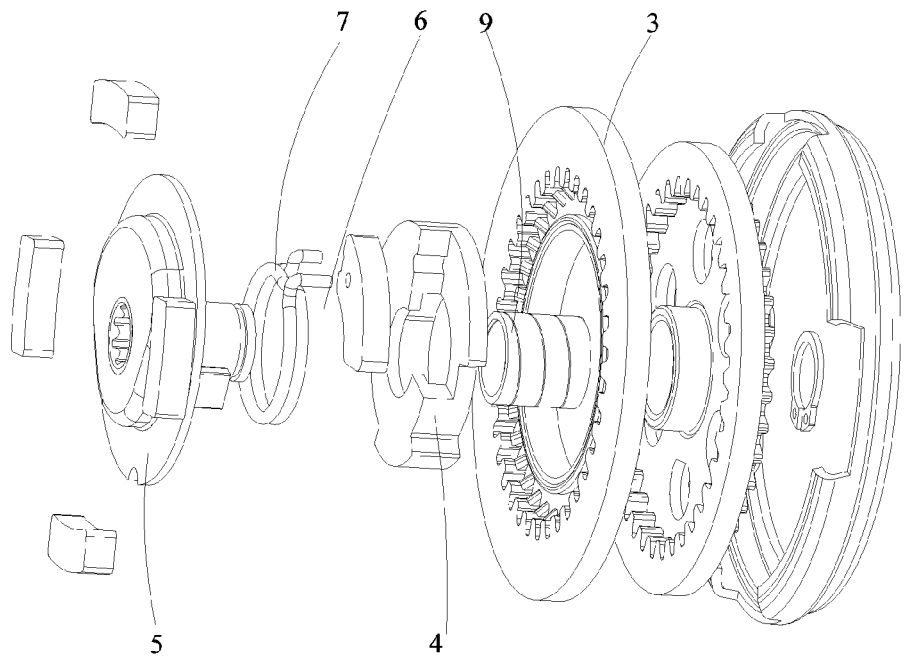
FIG. 3 is an assembling exploded view of a seat angle regulator provided in embodiment 1 of the disclosure.

Referring to FIG. 3, an assembling exploded view of a seat angle regulator is shown. The seat angle regulator of the disclosure includes a gear transmission mechanism, a drive component and a resistance torque structure.

Gear Transmission Mechanism

Figure 5:
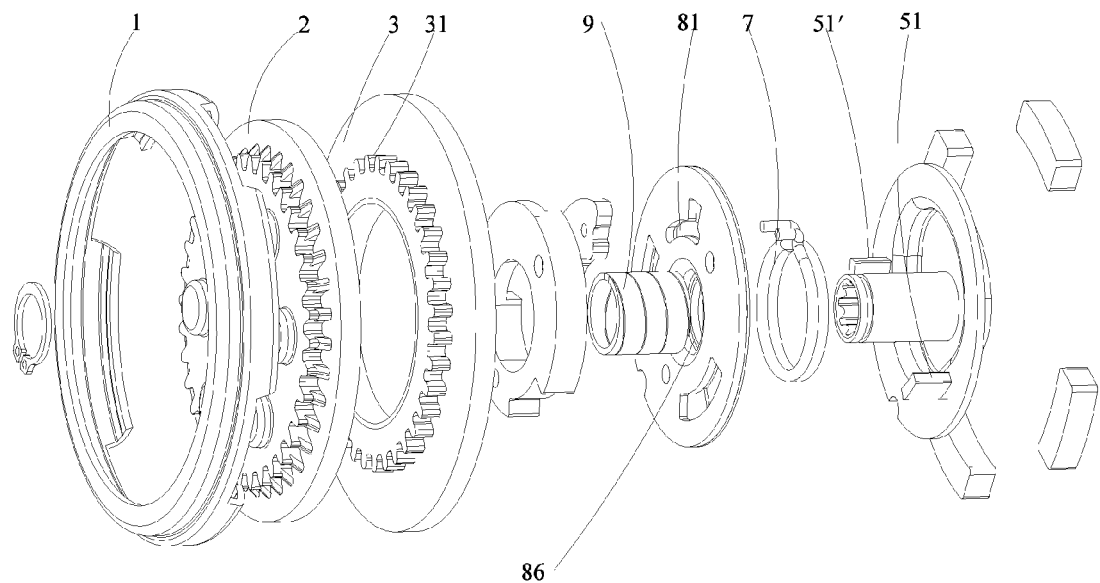
FIG. 5 is an assembling exploded view of the seat angle regulator provided in FIG. 4 viewed from another angle.
Figure 6:
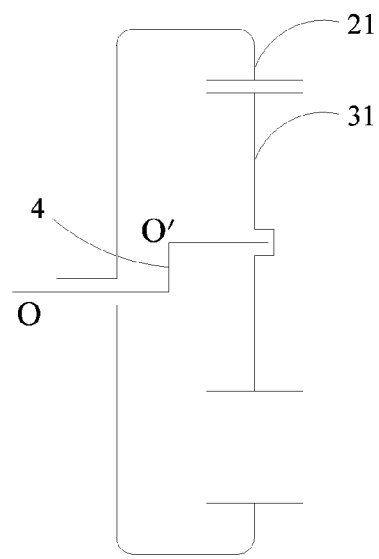
FIG. 6 is a view showing a transmission principle of a single-stage planetary gear with a small tooth-number difference.

The gear transmission mechanism employs a single-stage planetary gear transmission with a small tooth-number difference. An inner toothed plate 2 with an inner toothed ring 21 is fixedly connected with the backrest, an outer toothed plate 3 with an outer toothed ring 31 is fixedly connected with the seat base. The outer toothed plate 3 and the inner toothed plate are provided in a jacket 1, a compressed port of the jacket 1 is fixedly connected with the outer toothed plate 3, and when assembled, the outer toothed ring 31 of the outer toothed plate 3 is engaged with the inner toothed ring 21 of the inner toothed plate 2, a shaft shoulder 22 in the middle of the inner toothed plate 2 is inserted in a shaft center hole 32 in the middle of the outer toothed plate 3, the shaft shoulder 22 is eccentrically provided relative to the shaft center hole 32 and a radial eccentric area is formed therebetween. An eccentric wheel 4 as an eccentric structure is provided in the radial eccentric area, and the eccentric wheel 4 together with the inner and outer toothed rings 21, 31 constitute a gear planetary gear transmission mechanism with a small tooth-number difference whose transmission principle is as shown in FIG. 5. When an operation torque acts on a drive cam 5, the eccentric wheel 4 and the outer toothed ring 31 drive the inner toothed ring 21 to rotate, such that the outer toothed plate 3 rotates relatively to the inner toothed plate 2, realizing the purpose of regulating the angle of the backrest.

Under the action of a wedging torsion spring 7, an elastic deformation generated by the pre-compression of the wedging torsion spring 7 may act on the wedge block 6 of the gap eliminating structure and the eccentric wheel 4, such that both the wedge block 6 and the eccentric wheel 4 rotate circumferentially toward a small diameter section of the eccentric area, respectively, until reaching a wedged state, thereby eliminating an engaging gap between the inner and outer toothed plates.

The drive component includes a drive cam and a hollow rotating shaft. One end of the rotating shaft is fixedly connected to the middle portion of the drive cam, and the other end of the rotating shaft successively penetrates through the eccentric wheel and the shaft shoulder and is axially fixed on an outside end surface of the inner toothed plate by a locating connector, the rotating shaft being connected with the shaft shoulder in a clearance fitting manner.

The drive component is provided with a resistance torque structure for transmitting torque. When the drive cam is driven, the drive torque acting on the drive cam is transmitted to the eccentric wheel by the resistance torque structure to drive the eccentric wheel to rotate synchronously, thereby transmitting the torque to the gear transmission mechanism.

A special structure is as follows:

the drive component includes a drive cam 5, a rotating shaft 52 and two drive arms 51, 51', and the drive cam 5, the rotating shaft 52 and the two drive arms 51 form one entirety; after the rotating shaft 52 of the drive cam 5 successively passes though an inner hole of the wedging torsion spring 7, a central hole 23 of the inner toothed plate 2 and the jacket 1, an elastic baffle ring 10 is snapped in a slot 53 of a projected end of the rotating shaft 52, and a side surface of the baffle ring abuts against an end surface 24 of the central hole 23 of the inner toothed plate 2 to prevent the drive cam from falling off axially, thereby forming the entirety. A first and second drive arms 51 and 51' project from the drive cam 5 in an axial direction of the drive cam 5, the eccentric wheel 4 has a first accommodating area 44 and a second accommodating area 44', and an upper portion of the second accommodating area 44' in circumferential direction overlaps with the narrower end of the wedge block 6, as shown in the exploded view of FIG. 3; the first drive arm 51 is disposed in the first accommodating area 44 of the eccentric wheel 4; the second drive arm 51' is disposed in the second accommodating area 44' of the narrower end of the wedge block 6.

The drive component is provided with a resistance torque structure for transmitting torque. The resistance torque structure may be a compression spring, one end of the spring acts on the eccentric wheel and the other end acts on the locating connector provided on the rotating shaft, i.e. acting on the baffle ring in the slot of the rotating shaft. A pre-tightening force generated by the spring acts on the cooperating surfaces between the eccentric wheel and the drive cam, and when the drive cam is driven, the drive torque acting on the drive cam is transmitted to the eccentric wheel by the resistance torque structure to drive the eccentric wheel to rotate synchronously, thereby transmitting the torque to the gear transmission mechanism.

Resistance Torque Structure

The resistance torque structure is provided between the drive cam and the eccentric wheel, and includes a spring which is used for applying a resistance torque between the eccentric wheel and the drive cam. The spring directly applies an axial pressing force on the eccentric wheel, realizing the torque transmission between the eccentric wheel and the drive cam both by utilizing a friction force on the cooperating surfaces between the eccentric wheel and the drive cam.

Preferably, a friction material for increasing a friction coefficient between the eccentric wheel and the drive cam is provided on the cooperating surfaces between the eccentric wheel and the drive cam, the friction material is fixed on the eccentric wheel and/or the drive cam.

Embodiment 2

Figure 4:
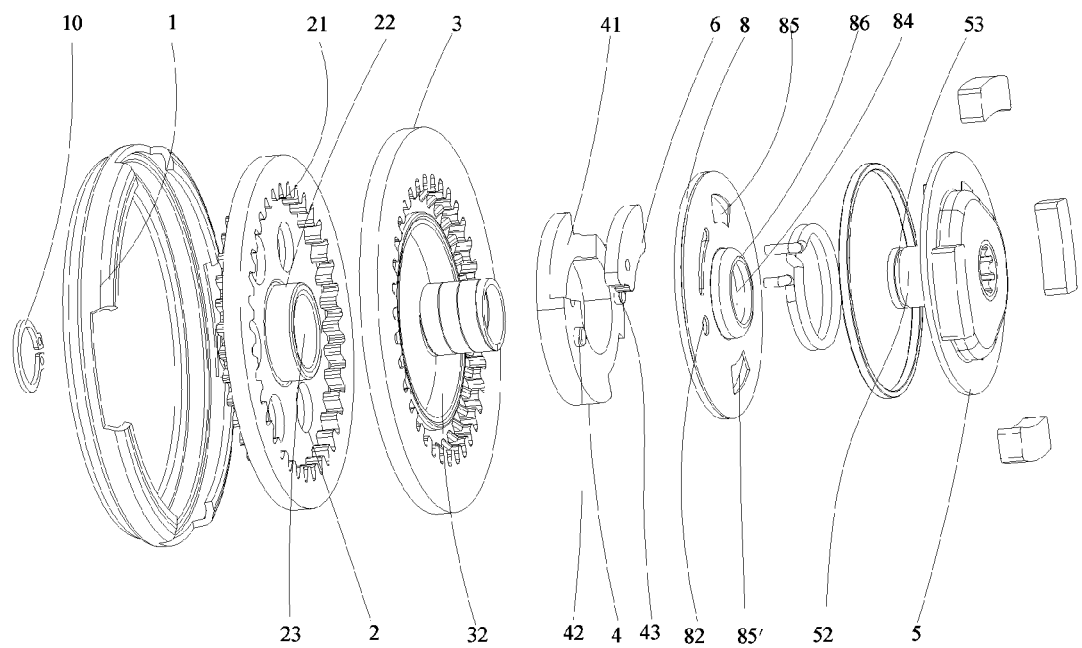
FIG. 4 is an assembling exploded view of a seat angle regulator provided in embodiment 2 of the disclosure.

As shown in FIG. 4 and FIG. 5, the difference between the embodiment 2 and the embodiment 1 is that, a drive plate is provided between the eccentric wheel and the drive cam. The drive plate is sheathed on the rotating shaft between the eccentric wheel and the drive cam, arc through holes is formed on a plate surface of the drive plate, drive arms provided on the drive cam pass through the arc through holes on the drive plate and are rotatably connected with the eccentric wheel. A drive torque driving the drive cam to rotate is transmitted to the drive plate by the resistance torque generated between the drive plate and the drive cam. The drive plate makes the structure of the eccentric wheel become simple After the rotating shaft 52 of the drive cam 5 successively passes though an inner hole of the wedging torsion spring 7, an inner hole 84 of the drive plate 8, a central hole 23 of the inner toothed plate 2 and the jacket 1, the elastic baffle ring 10 is snapped in the slot 53 on the projected end of the rotating shaft 52, and a side surface of the baffle ring abuts against the end surface 24 of the central hole 23 of the inner toothed plate 2 to prevent the drive cam from falling off axially, thereby forming an entirety; the first drive arm 51 passes through an arc hole 85 on the drive plate 8 and then is disposed in the first accommodating area 44 of the eccentric wheel 4; the second drive arm 51' passes through and out of an arc through hole 85' of the drive plate 8 and then is disposed in the second accommodating area 44' of the narrower end of the wedge block 6.

The drive cam and the drive plate are formed integrally by welding or riveting.

Figure 8:
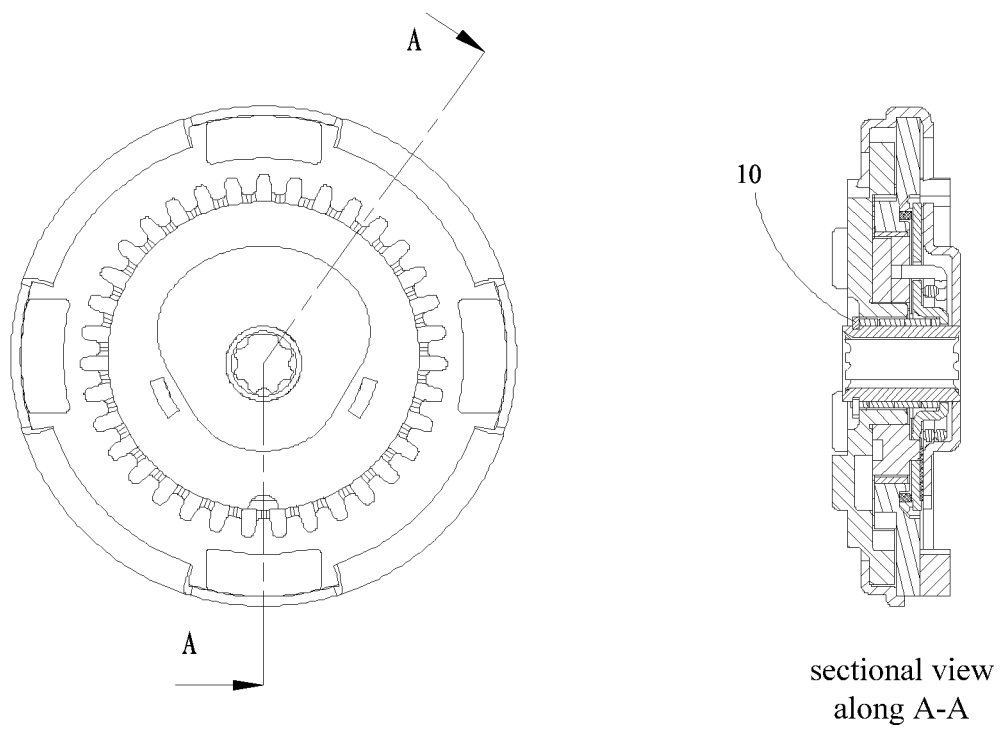
FIG. 8 is a sectional view of the seat angle regulator in the disclosure.

Preferably, the drive cam and the drive plate each have a separate structure, both side surfaces of the drive plate respectively abut against a surface of the drive cam and a surface of the eccentric wheel. A positioning hole in the drive plate is fitted and connected with the protrusion formed on the eccentric wheel to enable the drive plate and the eccentric wheel to rotate synchronously. The drive plate has a certain degree of freedom in an axial direction of the rotating shaft to adapt to its axial torelance, as shown in FIG. 8.

The resistance torque structure includes a spring for increasing the resistance torque between the drive plate and the drive cam. The spring realizes the torque transmission between the drive plate and the drive cam by increasing the resistance torque on the cooperating surfaces between the drive plate and the drive cam.

Preferably, the cooperating surfaces between the drive plate and the drive cam are provided with a friction material for increasing a friction coefficient between the drive plate and the drive cam. The friction material is fixed on the drive plate/the drive cam.

The spring is a compression spring compressed and sheathed on the rotating shaft between the drive plate and the inner toothed plate, and one end of the spring acts on an end surface of the drive plate and the other end acts on the locating connector at an end of the rotating shaft. The spring is connected with the shaft shoulder of the inner toothed plate in a clearance fitting manner.

The resistance torque structure includes a spring 9 and a friction material provided on the cooperating surfaces between the drive plate 8 and the drive cam, and the resistance torque structure cooperates with the drive cam 5. Two protrusions 42, 43 are provided on an upper surface of the eccentric wheel 4, two holes 82, 83 are provided on the drive plate 8 and are connected with the protrusions 42,43 of the eccentric wheel in a hole-shaft sliding fit manner. An arc groove 81 is provided on the drive plate 8, and two axial supporting feet 71, 71' of the wedging torsion spring 7 are inserted into the arc groove 81. A surface of the drive plate abuts against the upper surface of the eccentric wheel, and the drive plate and the eccentric wheel can circumferentially rotate in a synchronous manner and have a motion clearance in the axial direction.

Figure 7:
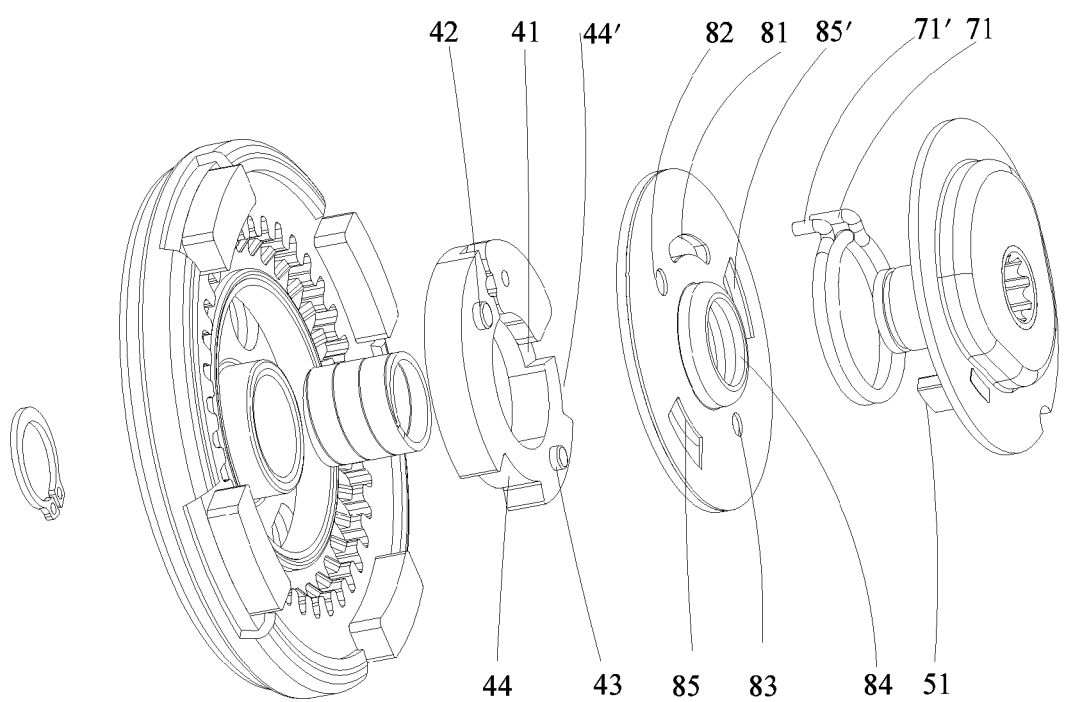
FIG. 7 is an assembling exploded view of a resistance torque structure, an eccentric wheel, a wedge block, a wedging torsion spring and the gear transmission system in the disclosure.

The spring 9 in this solution is preferably a compression spring with a rectangular cross-section. When compressed, the spring is sheathed on the rotating shaft 52 of the drive cam 5 in a clearance fitting manner and is disposed in the central hole 23 of the inner toothed plate 2. The outer diameter of the spring is in clearance fit with the central hole 23 of the inner toothed plate 2; one end of the spring acts on the drive plate, particularly on an convex hull bottom surface 86 on which the central hole 84 of the drive plate is located. The convex hull on which the central hole 84 is located in an inner diameter of the wedging torsion spring 7, and the other end of the spring abuts against the baffle ring 10 which is snapped in the slot 53 of the projected end of the rotating shaft 52, as shown in FIG. 7.

Figure 9:
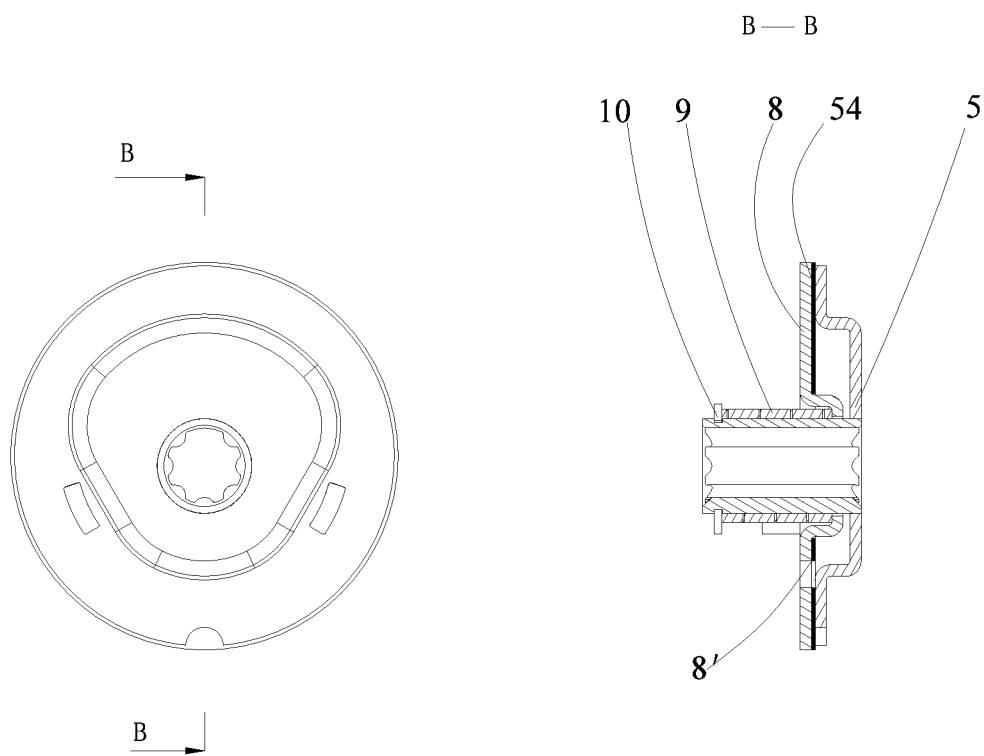
FIG. 9 is a schematic view of the assembling structure between the resistance torque structure and the drive cam in the disclosure.

The strength provided by the spring 9 acts on the drive plate 8, and the strength provided by the spring is enclosed between an end of the rotating shaft 52 of the drive cam 5 and the drive plate 8 and is not transmitted to the gear transmission mechanism. The spring 9 always enables a surface of the drive plate 8 and a cam lower surface 54 of the drive cam 5 to axially abut against each other and to be pressed against each other, as shown in the structural view of FIG. 9.

When the drive cam 5 circumferentially rotates relatively to the drive plate 8, the friction force between the drive plate 8 and the cam lower surface 54 of the drive cam 5 will prevent the motion of the drive cam 5. By adjusting the strength of the spring 9, a constant resistance torque may be provided between the drive plate 8 and the cam lower surface 54 of the drive cam 5.

By adjusting the strength of the spring 9, a torque value of the resistance torque relative to the centre of the rotating shaft 52 of the drive cam 5, which is generated by a friction force, may be designed. According to the usage requirement of a seat, it is necessary to adjust a ratio of the resistance torque to the gear drive torque. The pressing force provided by the spring 9 acts on the drive plate 8, and the strength provided by the spring is enclosed between the drive cam 5 and the drive plate 8 and is not transmitted to the gear transmission mechanism; therefore the gear transmission torque of the angle regulator will not increase.

The drive cam 5 is operated, and when the driving is along the direction from the wedge block 6 of the gap eliminating structure, under the action of the drive plate, the drive plate 8 will firstly drive the eccentric wheel 4 to rotate, and at the same time, the wedge block 6 is in a non-driving state, therefore the operation torque required for the entire angle regulator will increase slightly, and when the operation torque actually required for the angle regulator remains less than the value of the preset resistance torque, the eccentric wheel will be driven directly to move to realize the rotation of the angle regulator. In this state, the wedge block 6 is in a dragged state, the drive arm 51' on the drive cam 5 cannot hit the narrower end of the wedge block 6, therefore noises caused by hitting will not be generated and there will not be a delay of response to the regulating of the backrest caused by the void operating stoke.

When the required operation torque exceeds that of the drive plate, the drive cam 5 will rotate relatively to the drive plate 8 until the drive arm 51' on the drive cam 5 hits the narrower end of the wedge block 6; in this process, the operation torque of the angle regulator will not continue to increase; after the drive arm 5 contacts the narrower end of the wedge block 6, the drive arm 51' on the drive cam 5 will directly drive the wedge block 6, and then a wider end of the wedge block 6 drives the eccentric wheel 4 to rotate; in this process, since the eccentric wheel 4 remains in a slow motion process and thus the backrest remains in a regulating state, the response of the backrest is not obviously delayed; up to this stage, there is no relative movement in a circumferential direction between the drive cam 5 and the drive plate 8, therefore, the drive plate will disappear and the operation torque required for the entire angle regulator will still be equal to the gear drive torque; in the sequent stage, this state will maintain until a suitable angle is obtained by the regulating.

The drive cam 5 is operated, and when the driving is along the side of driving the eccentric wheel 4, the drive plate will directly drive the eccentric wheel 4, which has a gap eliminating structure and synchronizes with the drive plate 8, to rotate, rather than the case that the drive arm 51 on the drive cam 5 firstly passes the void stoke provided to eliminate a gap for the wedge block 6 and then drives the drive plate 8 to rotate, thereby the response delay of the backrest will not occur; and the drive arm 51 on the drive cam 5 will not directly contact an end surface of the first accommodating area 44 of the eccentric wheel 4, therefore there is no noises caused by hitting, and the drive arm 51 plays a role of protection only in an abnormal operation condition.

When the drive arm 51' rotates toward the direction of the wedge block 6, the eccentric wheel 4 synchronizing with the drive plate 8 is also in a slow motion process; since the electrical motor driving the drive cam 5 to rotate remains in a load for an essentially constant resistance torque which is essentially adequate for the rotation operation of the angle regulator, the rotation speed of the drive cam 5 synchronizing with the electrical motor remains in a steady state; therefore, when the drive arm 51' on the drive cam contacts the wedge block 6 of the gap eliminating structure, the relative speed of drive arm and the wedge block decreases to a very low level and noises generated by the hitting are controlled in a very low level.

Figure 10A:
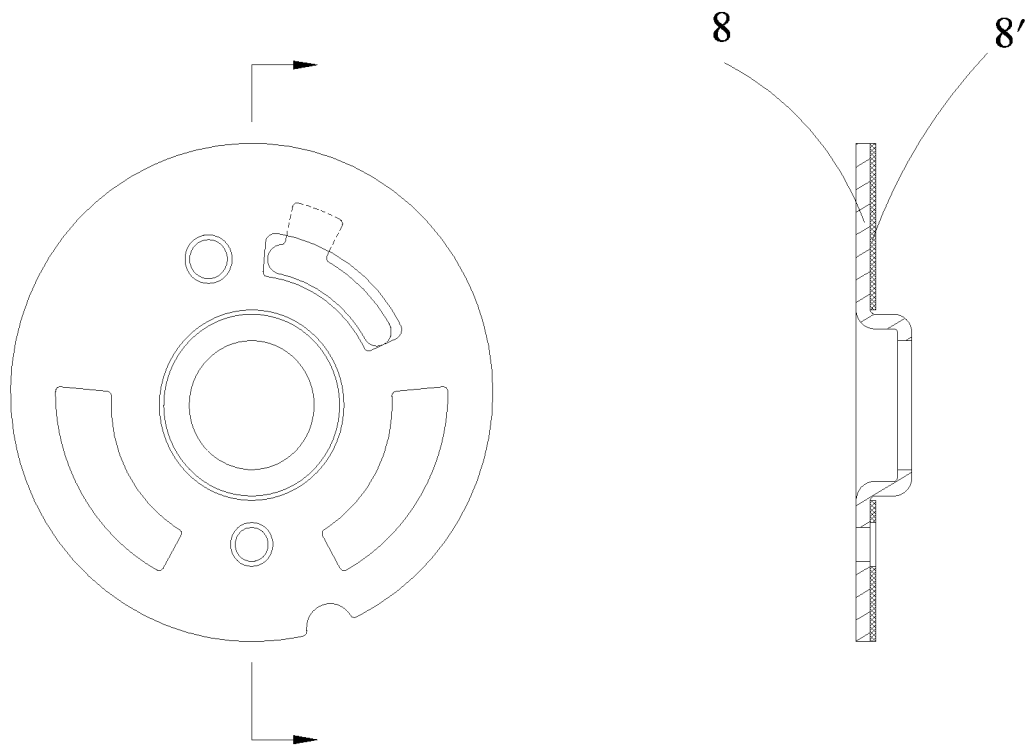
FIG. 10a is a schematic view showing the drive plate provided with a friction material in the disclosure.
Figure 10B:
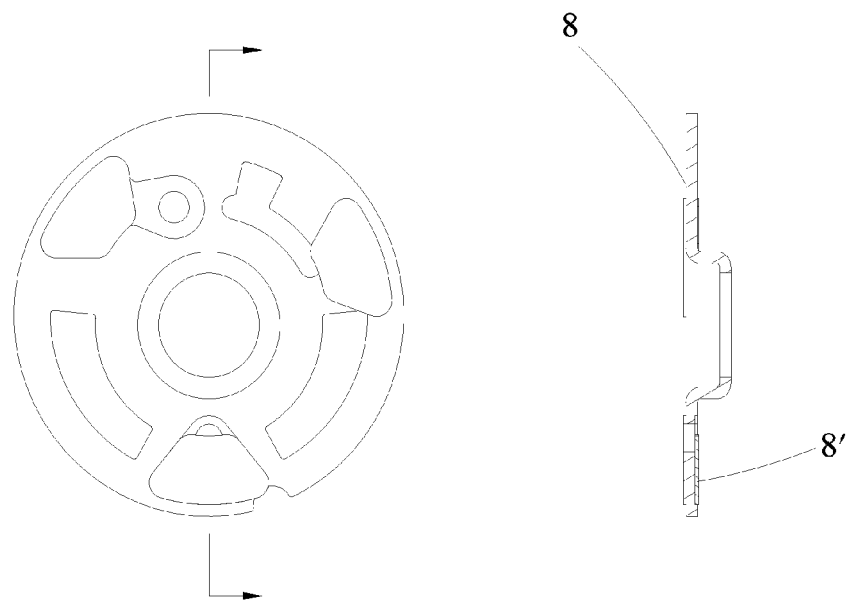
FIG. 10b is a schematic view showing another structure of the drive plate provided with a friction material in the disclosure.

In order to provide a suitable resistance torque drive torque, a friction material 8' for increasing friction is provided between the upper surface of the drive plate 8 and the cam lower surface 54 of the drive cam 5. The friction material 8' may be fixed on a surface of the drive plate 8 in a form of an entire surface or several blocks, as show in FIG. 10a and FIG. 10b. It should be understood that the friction material may also be fixed on the cam surface 54 of the drive cam 5, or may also be fixed on both the drive plate 8 and the drive cam 5.

Embodiment 3

Figure 11:
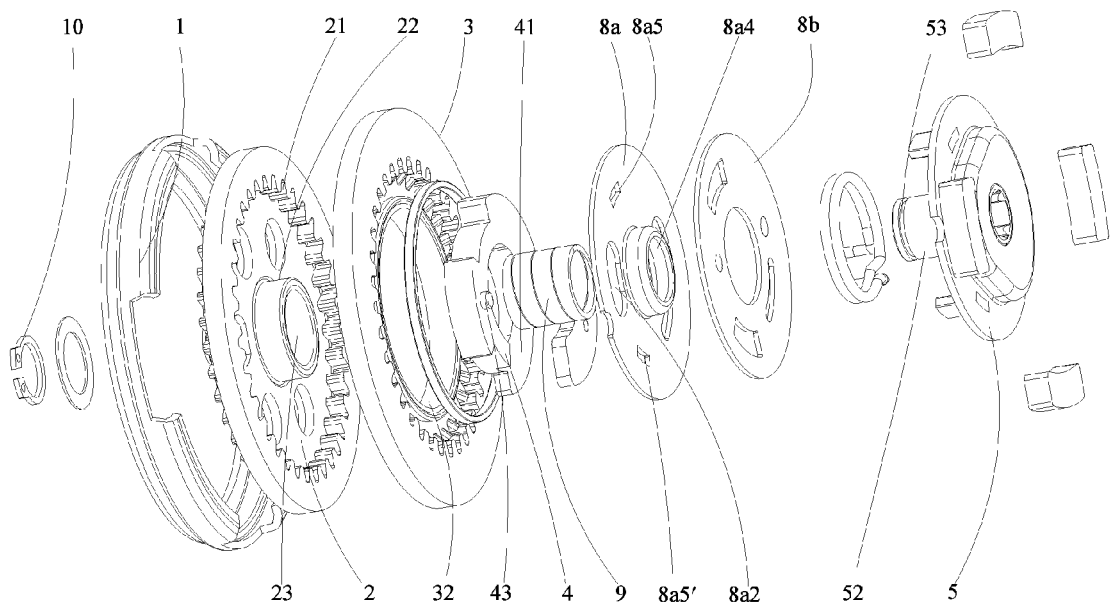
FIG. 11 is an assembling exploded view of the seat angle regulator provided in a third embodiment of the disclosure.
Figure 12:
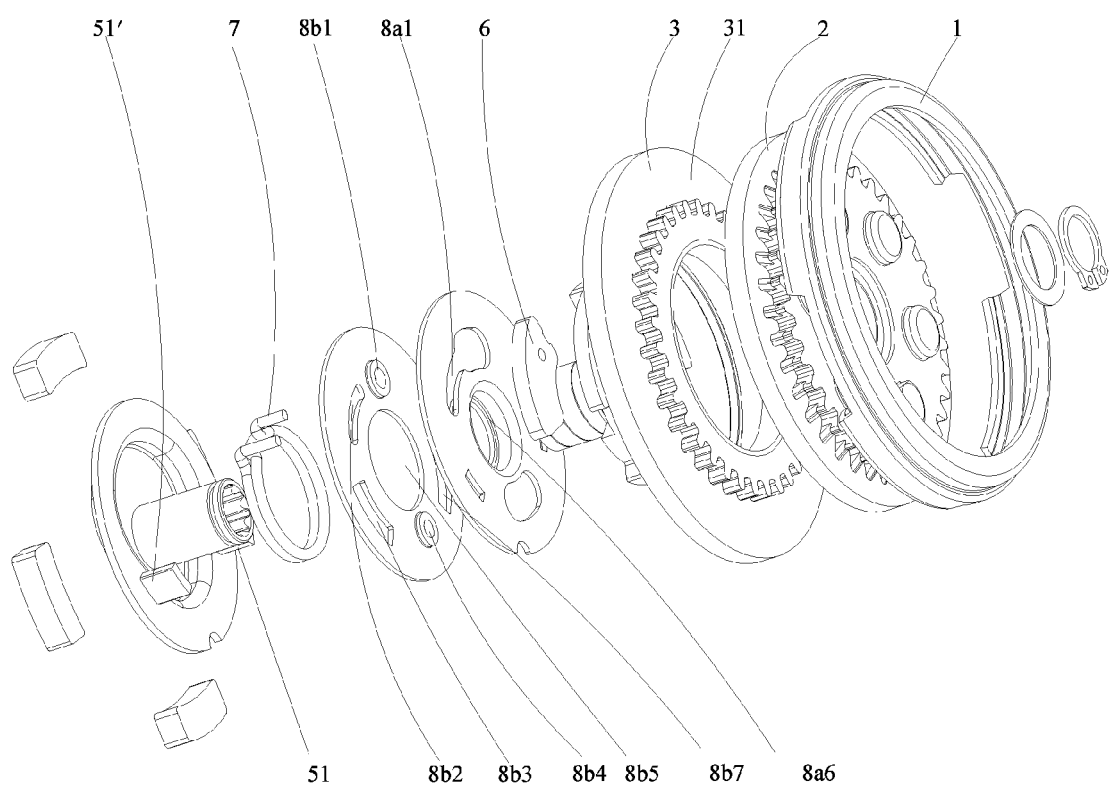
FIG. 12 is an assembling exploded view of the seat angle regulator provided in FIG. 11 viewed from another angle.
Figure 13:
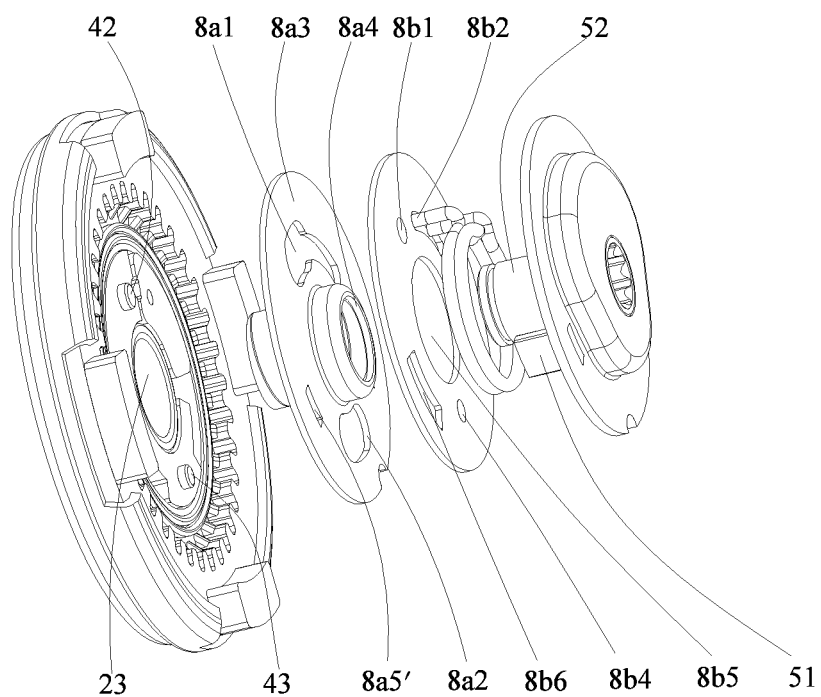
FIG. 13 is an assembling exploded view of a resistance torque structure, a drive plate, a cam, a wedging torsion spring and a gear transmission system in the disclosure.
Figure 14:
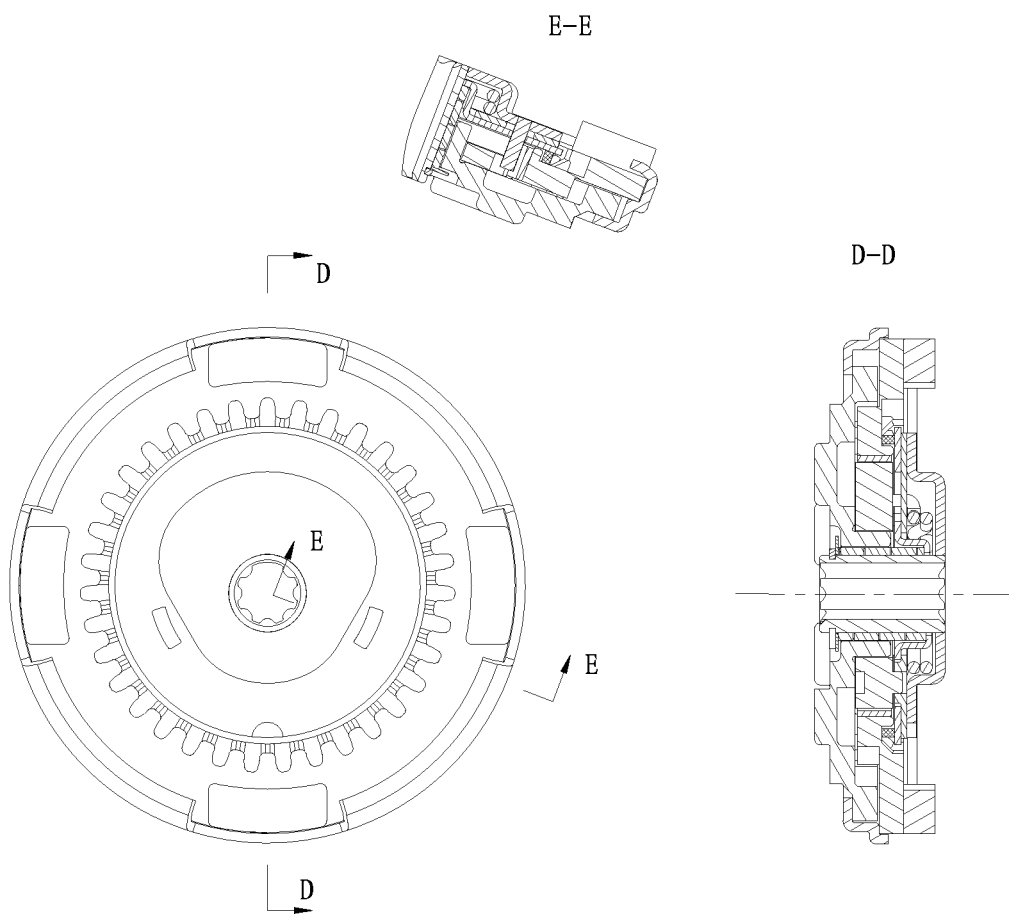
FIG. 14 is an assembling schematic view of the seat angle regulator in FIG. 11 of the disclosure.

As shown in FIG. 11 and FIG. 12, the difference between the embodiment 3 and the embodiment 2 is that, between the eccentric wheel and the drive cam, a movable synchronization pressing plate 8a is provided between a lower surface of the drive plate 8b and an upper surface of the eccentric wheel. The synchronization pressing plate 8a and the drive plate 8b are also sheathed on the rotating shaft between the eccentric wheel and the drive cam.

Arc through holes 8b3, 8b6 are formed on the plate surface of the drive plate 8b, and positioning holes 8a5', 8a5 are provided on the synchronization pressing plate 8a. Two drive arms provided on the drive cam 5 respectively pass through large arc through holes 8b3, 8b6 on the drive plate 8b and then continue to pass through positioning holes 8a5', 8a5 on the synchronization pressing plate 8a in a clearance fitting manner and reach the accommodating area 44 of the eccentric wheel and the second accommodating area 44' of the narrower end of the wedge block 6, respectively.

By the fitting of positioning holes 8a5', 8a5 on the synchronization pressing plate 8a and two drive arms, the drive cam 5 and the synchronization pressing plate 8a can rotate circumferentially in a synchronized manner and the synchronization pressing plate can slide axially along the drive arm, and under the action of the spring 9, the synchronization pressing plate 8a can be pressed on the surface 8b7 of the drive plate 8b.

Positioning holes 8b1,8b4 of the drive plate 8b are respectively assembled with two protrusions 42, 43 of the upper surface of the eccentric wheel 4, such that the drive plate 8b and the eccentric wheel 4 can rotate circumferentially in a synchronized manner and axially slide. The drive arms have enough circumferential motion space in the large arc through holes 8b3, 8b6 in the drive plate 8b, to meet the action requirement that the wedge block 6 and the eccentric wheel 4 are wedged toward both sides under the action of the wedging torsion spring.

Large arc grooves 8a1, 8a2 are also provided on the synchronization pressing plate 8a, wherein bosses on the drive plate 8b on which the positioning holes 8b1, 8b4 are located pass through the large arc groove 8a1, 8a2, respectively.

Two axial supporting feet 71, 71' of the wedging torsion spring 7 pass through the arc groove 8b2 of the drive plate 8b and through the arc groove 8a1 of the synchronization pressing plate 8a, and respectively act on the eccentric wheel 4 and the wedge block 6 to wedge toward both sides, so as to eliminate the gap.

After the rotating shaft 52 of the drive cam 5 successively passes though an inner hole of the wedging torsion spring 7, an inner hole 85b of the drive plate 8b, an inner hole 8a4 of the synchronization pressing plate 8a, a central hole 23 of the inner toothed plate 2 and the jacket 1, the elastic baffle ring 10 is snapped in the slot 53 of the projected end of the rotating shaft 52, and the side surface of the baffle ring abuts against the end surface 24 of the central hole 23 of the inner toothed plate 2 to prevent the drive cam from falling off axially, thereby forming an entirety.

Figure 15:
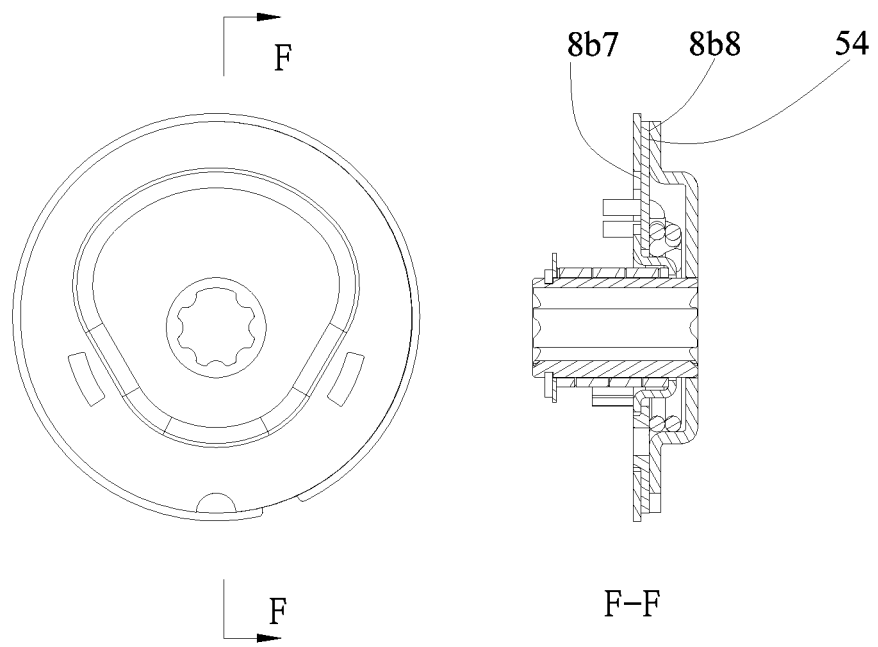
FIG. 15 is an assembling schematic view of a resistance torque structure, a drive plate, a cam, a wedging torsion spring, a baffle ring and the like of the seat angle regulator in FIG. 11 of the disclosure.

Like the embodiment 2, the spring 9 in this solution is preferably a compression spring with a rectangular cross-section. When the spring is compressed, the spring is sheathed on the rotating shaft 52 of the drive cam 5 in a clearance fitting manner and is disposed in the central hole 23 of the inner toothed plate 2. The outer diameter of the spring is in clearance fit with the central hole 23 of the inner toothed plate 2; one end of the spring acts on the synchronization pressing plate 8a, particularly on an convex hull bottom surface 8a6 on which the inner hole 8a4 of the synchronization pressing plate 8a is located. The convex hull on which the inner hole 8a4 is located is disposed in an inner diameter of the wedging torsion spring 7 and is disposed in the inner hole 8b5 of the drive plate 8b, and the other end of the spring abuts against the baffle ring on which the slot 53 of the projected end of the rotating shaft 52h is provided. In order to effectively provide position limiting and to avoid an adverse effect due to the circumferential movement of the spring 9, a pad is provided between an end portion of the spring 9 and the baffle ring 10, as shown in FIG. 15.

The strength provided by the spring 9 acts on the synchronization pressing plate 8a and presses the synchronization pressing plate 8a, the drive plate 8b, the cam of the drive cam 5 together. There are formed two friction pairs on the two side surfaces of the drive plate 8b. When a drive torque is applied onto the drive cam 5, a friction resistance torque relative to the center of the rotating shaft 52, which is formed by a friction force between the cam lower surface 54 of the drive cam 5 and the side surface 8b8 of the drive plate 8b, will drive the drive plate 8b to rotate, and at the same time, a friction force between the upper surface 8a3 of the synchronization pressing plate 8a synchronizing with the drive cam 5 and the side surface 8b7 of the drive plate 8b may also form a friction resistance torque relative to the center of the rotating shaft 52, which resistance torque may also drive the drive plate 8b to rotate. Under the driving of the two friction resistance torques, the drive plate 8b transmits the motion to the eccentric wheel 4, thereby realizing the angle regulating of the angle regulator.

Therefore, under an axial force of the same spring 9, a friction resistance torque effect which is twice that in the embodiment 2 will be generated and the drive effect will be more favorable.

According to requirements, a friction material for increasing a friction coefficient may be provided on the cooperating surfaces between the synchronization pressing plate 8a and the drive plate 8b and between the drive plate 8b and the cam of the drive cam 5. The friction material is fixed on the synchronization pressing plate 8a and/or the drive plate 8b and/or the cam, or the drive plate 8b is directly made from the friction material.

Like the embodiment 2, the drive cam 5 is operated, and when the driving is along the direction from the wedge block 6 of the gap eliminating structure, under the action of the two resistance torques, the drive plate 8b will also firstly drive the eccentric wheel 4 to rotate, and at the same time, the wedge block 6 is in a non-driving state, therefore the operation torque required for the entire angle regulator will increase slightly; when the operation torque actually required for the angle regulator remains less than the value of the preset resistance torque, the motion of the eccentric wheel will be driven directly and the rotation of the angle regulator will be realized; in this state, the wedge block 6 is in a dragged state, the drive arm 51' of the drive cam 5 cannot hit the narrower end of the wedge block 6, therefore noises caused by hitting will not be generated.

When the operation torque, due to the backrest load, exceeds the value of the preset resistance torque, the drive cam 5 will rotate relatively to the drive plate 8b at a significantly reduced speed, until the drive arm 51' of the drive cam 5 hits the narrower end of the wedge block 6; in this process, the operation torque input into the angle regulator will no longer continue to increase; when the drive arm 51' contacts the narrower end of the wedge block 6, the drive arm 51' of the drive cam 5 will directly drive the wedge block 6, and then a wider end of the wedge block drives the eccentric wheel 4 to rotate; in this process, since the eccentric wheel 4 remains in a slow motion process and the backrest remains in a regulating state, the response of the backrest is not obviously delayed and noises caused by hitting are not obvious; up to this stage, there is no relative movement in the circumferential direction between the drive cam 5 and the drive plate 8b, therefore, the resistance torque provided by the friction force will not substantially function, therefore the operation torque required for the angle regulator will be still equal to the gear drive torque; in the sequent stage, this state will maintain until a suitable angle is obtained by the regulating.

The drive cam 5 is operated, and when the driving is along the side of driving the eccentric wheel 4, the resistance torque may directly drive the eccentric wheel 4, which has a gap eliminating structure and synchronizes with the drive plate 8b, to rotate, rather than the case that the drive arm 51 on the drive cam 5 firstly passes the void stoke provided to eliminate a gap for the wedge block 6 and then drives the drive plate 8 to rotate, thereby the response delay of the backrest will not occur, and the drive arm 51 on the drive cam 5 will not directly contact an end surface of the first accommodating area 44 of the eccentric wheel 4, therefore there is no noises caused by hitting, and the drive arm 51 plays a role of protection only in an abnormal operation condition.

Compared with the angle regulator without a resistance torque transmission system, the operation torque of the angle regulator described in the disclosure is as follows: the whole operation torque does not change obviously, which solves successfully the problem occurring in the technical solution of the patent document CN1149157C; the problem of the delay of response to the regulating for the backrest caused by the void operation stoke necessary for adapting with the gap eliminating structure and the assembling and manufacturing torelance is also solved; noises in the backrest regulating and reversing process are controlled in a quite low state.

Embodiment 4

Figure 16:
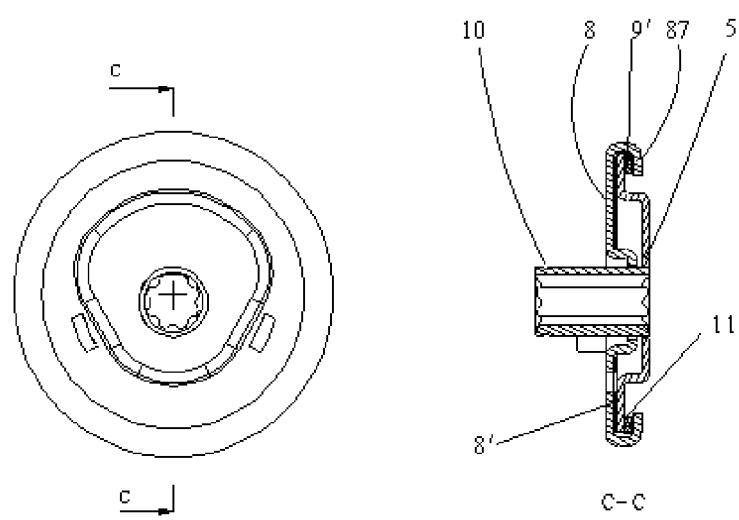
FIG. 16 is a schematic view of a structure for providing the resistance torque according to the disclosure.
Figure 17:
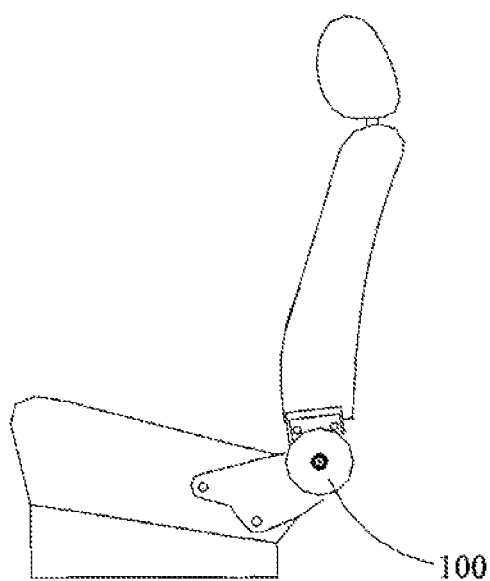
FIG. 17 is an outline view of a seat according to the disclosure.

The embodiment 4 differs from the embodiment 2 and the embodiment 3 in that the arrangement of the resistance torque structure and the structure of the drive plate are different. As shown in FIG. 16, the drive plate structure in this embodiment is as follows: an everted buckle edge is formed at a circumferential edge of the drive plate, and an outer circumferential edge of the drive cam is enveloped inside the buckle edge. A circumferential ring gap is formed between the buckle edge and the outer circumferential edge of the drive cam, and a resistance torque structure for increasing the resistance torque at the cooperating surfaces between the drive plate and the drive cam are provided in the circumferential ring gap. Here the resistance torque structure is an elastic element. A specified friction resistance torque may also be provided between the drive cam 5 and the drive plate 8 only by utilizing the pressing force of the elastic element.

In addition, in addition to the elastic element provided in the above-described circumferential ring gap, the action of the spring in other embodiments is also used, such that the resistance torque between the drive cam and the drive plate reaches the required value, thereby to make the regulating of the seat more steady, improving the comfortableness of the seat.

The above-mentioned embodiments are only the preferred embodiments. It should be noted that, for those skilled in the art, several changes and modifications can be made to achieve the object of the disclosure, without departing from the principle of the disclosure. The scope of protection of the disclosure shall be defined by the appended claims.

The invention claimed is:

1. A seat angle regulator comprising:
   a gear transmission mechanism comprising an inner toothed plate with an inner toothed ring, an outer toothed plate with an outer toothed ring, and an eccentric wheel with a wedge block, wherein the inner toothed ring of the inner toothed plate is engaged with the outer toothed ring of the outer toothed plate, a hollow shaft shoulder is formed in a middle of the inner toothed plate, and the eccentric wheel is on an outer circumferential surface of the shaft shoulder; and
   a drive component comprising a drive cam and a hollow rotating shaft, wherein one end of the rotating shaft is fixedly connected with a middle portion of the drive cam, the other end of the rotating shaft penetrates through the eccentric wheel and the shaft shoulder sequentially and is axially fixed on the inner toothed plate via a locating connector, and the rotating shaft is connected with the shaft shoulder in a clearance fitting manner,
   wherein a resistance torque structure for transmitting torque is provided to apply forces on a surface of the drive cam and on a surface of the eccentric wheel that is opposite to the surface of the drive cam, and the resistance torque structure is configured to, when the drive cam is driven, transmit a driving torque acting on the drive cam to the eccentric wheel to drive the eccentric wheel through the forces applied on the surface of the drive cam and on the surface of the eccentric wheel to synchronously rotate and realize a torque transmission to the gear transmission mechanism.

2. The seat angle regulator according to claim 1, wherein the resistance torque structure comprises a spring for increasing a friction torque between the eccentric wheel and the drive cam, and the spring realizes the torque transmission between the eccentric wheel and the drive cam by increasing a friction torque between cooperating surfaces of the eccentric wheel and the drive cam.

3. The seat angle regulator according to claim 2, wherein a drive plate is further provided between the eccentric wheel and the drive cam, the drive plate is sheathed on the rotating shaft between the eccentric wheel and the drive cam, an arc through hole is formed on a plate surface of the drive plate, and a drive arm provided on the drive cam passes through the arc through hole on the drive plate and is rotatably connected with the eccentric wheel; and
   the drive torque driving the drive cam to rotate is transmitted to the drive plate by a friction torque generated between the drive plate and the drive cam.

4. The seat angle regulator according to claim 3, wherein the drive cam and the drive plate each have a separate structure, and a pre-tightening force generated by the spring acts on cooperating surfaces of the drive plate and the drive cam, such that an end surface of the drive plate abuts against a surface of the drive cam; and
   the drive plate is provided with a positioning hole fitting a protrusion on the eccentric wheel, the positioning hole on the drive plate is fitly connected to the protrusion formed on the eccentric wheel to realize the synchronous rotation of the eccentric wheel and the drive plate, and a clearance in an axial direction of the rotating shaft is formed for the drive plate to adapt to an axial tolerance of the rotating shaft.

5. The seat angle regulator according to claim 4, wherein the spring is a compression spring which is compressed and sheathed on the rotating shaft between the drive plate and the inner toothed plate, one end of the spring acts on an end surface of the drive plate and the other end of the spring acts on the locating connector at an end of the rotating shaft, and the spring is connected with the shaft shoulder of the inner toothed plate in a clearance fitting manner;
   by means of the pre-tightening force generated by the spring, the drive plate abuts against the drive cam, and the eccentric wheel is driven to rotate by the friction resistance torque formed by the cooperating surfaces of the drive plate and the drive cam.

6. The seat angle regulator according to claim 5, wherein the spring is a compression spring with a rectangular section.

7. The seat angle regulator according to claim 4, wherein a movable synchronization pressing plate is provided between the drive plate and the eccentric wheel, and the synchronization pressing plate is sheathed on the rotating shaft between the eccentric wheel and the drive cam;

positioning holes and an arc groove are formed in the synchronization pressing plate, the positioning holes in the synchronization pressing plate fits two drive arms of the drive cam respectively, the synchronization pressing plate and the drive cam are rotatable circumferentially in a synchronized manner after being fitted with each other, and the synchronization pressing plate is axially slidable along the drive arms, and the protrusion on the eccentric wheel penetrates through the arc groove in the synchronization pressing plate and is inserted into the positioning hole on the drive plate;

the pre-tightening force generated by the spring acts on the cooperating surfaces of the drive plate and the drive cam, and cooperating surfaces of the drive plate and the synchronization pressing plate that are engaged with each other, such that side surfaces of the drive plate abut against the drive cam and the synchronization pressing plate, respectively.

8. The seat angle regulator according to claim 7, wherein the spring is a compression spring which is compressed and sheathed on the rotating shaft between the drive plate and the inner toothed plate, one end of the spring acts on an end surface of the synchronization pressing plate and the other end of the spring acts on the locating connector at the end of the rotating shaft, and the spring is connected with the shaft shoulder of the inner toothed plate in a clearance fitting manner;

under the action of the elastic force of the spring, the synchronization pressing plate abuts against one end surface of the drive plate, the other end surface of the drive plate is wedged against the drive cam, and the eccentric wheel is driven by applying a toque to the drive plate through a friction resistance torque formed by the cooperating surfaces of the drive plate and the drive cam and a friction resistance torque formed by the cooperating surfaces of the synchronization pressing plate and the drive plate.

9. The seat angle regulator according to claim 7, wherein a friction material for increasing a friction coefficient is provided on the cooperating surfaces of the drive plate and the drive cam and the cooperating surfaces of the synchronization pressing plate and the drive plate, and the friction material is fixed on the drive plate and/or the drive cam and/or the synchronization pressing plate.

10. The seat angle regulator according to claim 4, wherein a circumference edge of the drive plate is bended to form an everted buckle edge, an outer circumferential edge of the drive plate is enveloped in the buckle edge, a circumferential ring gap is formed between the buckle edge and the outer circumferential edge of the drive cam enveloped in the buckle edge, and an elastic element for increasing a friction damp at the cooperating surfaces of the drive plate and the drive cam is provided in the circumferential ring gap.

11. The seat angle regulator according to claim 3, wherein a friction material for increasing a friction coefficient of the cooperating surfaces of the drive plate and the drive cam is provided on the cooperating surfaces of the drive plate and the drive cam, and the friction material is fixed on the drive plate and/or the drive cam.

12. A seat comprising a seat base, a backrest hinged to the seat base, and a seat angle regulator disposed between the seat base and the backrest, wherein the seat angle regulator comprises:

a gear transmission mechanism comprising an inner toothed plate with an inner toothed ring, an outer toothed plate with an outer toothed ring, and an eccentric wheel with a wedge block, wherein the inner toothed ring of the inner toothed plate is engaged with the outer toothed ring of the outer toothed plate, a hollow shaft shoulder is formed in a middle of the inner toothed plate, and the eccentric wheel sheathed on an outer circumferential surface of the shaft shoulder; and a drive component comprising a drive cam and a hollow rotating shaft, wherein one end of the rotating shaft is fixedly connected with a middle portion of the drive cam, the other end of the rotating shaft penetrates through the eccentric wheel and the shaft shoulder sequentially and is axially fixed on the inner toothed plate via a locating connector, and the rotating shaft is connected with the shaft shoulder in a clearance fitting manner, wherein a resistance torque structure for transmitting torque is provided to apply forces on a surface of the drive cam and on a surface of the eccentric wheel that is opposite to the surface of the drive cam, and the resistance torque structure is configured to, when the drive cam is driven, transmit a driving torque acting on the drive cam to the eccentric wheel through the forces applied on the surface of the drive cam and on the surface of the eccentric wheel to drive the eccentric wheel to synchronously rotate and realize a torque transmission to the gear transmission mechanism, and the outer toothed plate and the inner toothed plate are each connected to one of the seat base and the backrest, and a gear drive torque driving the gear transmission mechanism to rotate is provided by the drive electric motor acting on the rotating shaft.

13. The seat according to claim 12, wherein the resistance torque structure comprises a spring for increasing a friction torque between the eccentric wheel and the drive cam, and the spring realizes the torque transmission between the eccentric wheel and the drive cam by increasing a friction torque between cooperating surfaces of the eccentric wheel and the drive cam.

14. The seat according to claim 13, wherein a drive plate is further provided between the eccentric wheel and the drive cam, the drive plate is sheathed on the rotating shaft between the eccentric wheel and the drive cam, an arc through hole is formed on a plate surface of the drive plate, and a drive arm provided on the drive cam passes through the arc through hole on the drive plate and is rotatably connected with the eccentric wheel; and the drive torque driving the drive cam to rotate is transmitted to the drive plate by a friction torque generated between the drive plate and the drive cam.

15. The seat according to claim 14, wherein the drive cam and the drive plate each have a separate structure, and a pre-tightening force generated by the spring acts on cooperating surfaces of the drive plate and the drive cam, such that an end surface of the drive plate abuts against a surface of the drive cam; and the drive plate is provided with a positioning hole fitting a protrusion on the eccentric wheel, the positioning hole on the drive plate is fitly connected to the protrusion formed on the eccentric wheel to realize the synchronous rotation of the eccentric wheel and the drive plate, and a clearance in an axial direction of the rotating shaft is formed for the drive plate to adapt to an axial tolerance of the rotating shaft.

16. The seat according to claim 15, wherein the spring is a compression spring which is compressed and sheathed on the rotating shaft between the drive plate and the inner toothed plate, one end of the spring acts on an end surface of the drive plate and the other end of the spring acts on the locating connector at an end of the rotating shaft, and the spring is connected with the shaft shoulder of the inner toothed plate in a clearance fitting manner;

by means of the pre-tightening force generated by the spring, the drive plate abuts against the drive cam, and the eccentric wheel is driven to rotate by the friction resistance torque formed by the cooperating surfaces of the drive plate and the drive cam.

17. The seat according to claim 15, wherein a movable synchronization pressing plate is provided between the drive plate and the eccentric wheel, and the synchronization pressing plate is sheathed on the rotating shaft between the eccentric wheel and the drive cam;

positioning holes and an arc groove are formed in the synchronization pressing plate, the positioning holes in the synchronization pressing plate fits two drive arms of the drive cam respectively, the synchronization pressing plate and the drive cam are rotatable circumferentially in a synchronized manner after being fitted with each other, and the synchronization pressing plate is axially slidable along the drive arms, and the protrusion on the eccentric wheel penetrates through the arc groove in the synchronization pressing plate and is inserted into the positioning hole on the drive plate;

the pre-tightening force generated by the spring acts on the cooperating surfaces of the drive plate and the drive cam, and cooperating surfaces of the drive plate and the synchronization pressing plate that are engaged with each other, such that side surfaces of the drive plate abut against the drive cam and the synchronization pressing plate, respectively.

18. The seat according to claim 17, wherein the spring is a compression spring which is compressed and sheathed on the rotating shaft between the drive plate and the inner toothed plate, one end of the spring acts on an end surface of the synchronization pressing plate and the other end of the spring acts on the locating connector at the end of the rotating shaft, and the spring is connected with the shaft shoulder of the inner toothed plate in a clearance fitting manner;

under the action of the elastic force of the spring, the synchronization pressing plate abuts against one end surface of the drive plate, the other end surface of the drive plate is wedged against the drive cam, and the eccentric wheel is driven by applying a toque to the drive plate through a friction resistance torque formed by the cooperating surfaces of the drive plate and the drive cam and a friction resistance torque formed by the cooperating surfaces of the synchronization pressing plate and the drive plate.

19. The seat according to claim 17, wherein a friction material for increasing a friction coefficient is provided on the cooperating surfaces of the drive plate and the drive cam and the cooperating surfaces of the synchronization pressing plate and the drive plate, and the friction material is fixed on the drive plate and/or the drive cam and/or the synchronization pressing plate.

20. The seat according to claim 14, wherein a friction material for increasing a friction coefficient of the cooperating surfaces of the drive plate and the drive cam is provided on the cooperating surfaces of the drive plate and the drive cam, and the friction material is fixed on the drive plate and/or the drive cam.

\* \* \* \* \*